(12) United States Patent
Tsirkin

(10) Patent No.: US 9,110,704 B2
(45) Date of Patent: *Aug. 18, 2015

(54) PRE-WARMING OF MULTIPLE DESTINATIONS FOR FAST LIVE MIGRATION

(75) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 148 days.

This patent is subject to a terminal disclaimer.

(21) Appl. No.: 13/484,753

(22) Filed: May 31, 2012

(65) Prior Publication Data

US 2013/0326175 A1    Dec. 5, 2013

(51) Int. Cl.
G06F 12/00    (2006.01)
G06F 9/455    (2006.01)
G06F 11/14    (2006.01)

(52) U.S. Cl.
CPC ........ *G06F 9/45558* (2013.01); *G06F 11/1438* (2013.01); *G06F 11/1484* (2013.01); *G06F 2009/4557* (2013.01)

(58) Field of Classification Search
USPC ...................................... 711/6, 100, 161, 162
See application file for complete search history.

(56) References Cited

U.S. PATENT DOCUMENTS

| 7,680,919 | B2 * | 3/2010 | Nelson | 709/223 |
|---|---|---|---|---|
| 2007/0180436 | A1 * | 8/2007 | Travostino et al. | 717/138 |
| 2011/0205904 | A1 * | 8/2011 | Nakagawa | 370/241 |
| 2012/0084445 | A1 * | 4/2012 | Brock et al. | 709/226 |
| 2012/0159101 | A1 | 6/2012 | Miyoshi | |

OTHER PUBLICATIONS

U.S. Appl. No. 13/484,382, NonFinal Office Action dated Jan. 28, 2014.
U.S. Appl. No. 13/484,462, NonFinal Office Action dated Feb. 12, 2014.
U.S. Appl. No. 13/484,382, Final Office Action dated Aug. 12, 2014.
U.S. Appl. No. 13/484,382, NonFinal Office Action dated Dec. 15, 2014.
U.S. Appl. No. 13/484,462, Final Office Action dated Sep. 10, 2014.
U.S. Appl. No. 13/484,462, Notice of Allowance dated Dec. 15, 2014.
Clark, Christopher, et al. "Live Migration of Virtual Machines" USENIX Association, NSDI 2005: 2nd Symposium on Networked Systems Design & Implementation, p. 273-286. 14 pages.

* cited by examiner

*Primary Examiner* — Midys Rojas
(74) *Attorney, Agent, or Firm* — Lowenstein Sandler LLP

(57) ABSTRACT

A method for fast migrating of a source virtual machine located on a source host to one or more destination hosts is provided. A source migration manager of a hypervisor receives identities of a plurality of destination hosts. The source migration manager copies at least one data segment corresponding to a portion of a state of a source virtual machine to the pluralities of destination hosts. The source migration manager receives a command to migrate the source virtual machine to one or more selected destination hosts of the plurality of destination hosts after copying the at least one data segment to the destination hosts. When the source migration manager receives an indication of successful booting of at least one destination virtual machine, the source migration manager terminates transmission of the state of the source virtual machine to the remaining plurality of destination hosts.

20 Claims, 7 Drawing Sheets

PRE-WARMING OF MULTIPLE DESTINATIONS FOR FAST LIVE MIGRATION

RELATED APPLICATIONS

The present application is related to co-filed U.S. patent application Ser. No. 13/484,382, filed May 31, 2012 entitled "Multiple Destination Live Migration", and to co-filed U.S. patent application Ser. No. 13/484,462, filed May 31, 2012 entitled "Pre-Warming Destination For Fast Live Migration", which are assigned to the assignee of the present application.

TECHNICAL FIELD

Embodiments of the present invention relate to a computer system, and more specifically, to a method for fast migrating of a source virtual machine located on a source host to one or more destination hosts.

BACKGROUND

The use of virtualization is becoming widespread. Virtualization describes a software abstraction that separates a computer resource and its use from an underlying physical device. Generally, a virtual machine (VM) provides a software execution environment and may have a virtual processor, virtual system memory, virtual storage, and various virtual devices. Virtual machines have the ability to accomplish tasks independently of particular hardware implementations or configurations.

Virtualization permits multiplexing of an underlying host computer between different virtual machines. The host computer allocates a certain amount of its resources to each of the virtual machines. Each virtual machine is then able to use the allocated resources to execute applications, including operating systems (referred to as guest operating systems (OS)). The software layer providing the virtualization is commonly referred to as a hypervisor and is also known as a virtual machine monitor (VMM), a kernel-based hypervisor, or a host operating system. The hypervisor emulates the underlying hardware of the host computer, making the use of the virtual machine transparent to the guest operating system and the user of the computer.

Virtual machines may be migrated between a source host computing platform ("the source host") and a destination host computing platform ("the destination host") connected over a network, which may be a local-area network or a wide area-network that may include the Internet. Migration permits a clean separation between hardware and software, thereby improving facilities fault management, load balancing, and low-level system maintenance.

A brute force method of migrating virtual machines between a source host and a destination host over a network is to suspend the source virtual machine, copy its state to the destination host, boot the copied virtual machine on the destination host, and remove the source virtual machine. This approach has been shown to be impractical because of the large amount of down time users may experience. A more desirable approach is to permit a running source virtual machine to continue to run during the migration process, a technique known as live migration. Live migration permits an administrator to move a running virtual machine between different physical machines without disconnecting a running client or application program. For a successful live migration, memory, storage, and network connectivity of the virtual machine needs to be migrated from the source host to the destination host.

Related art methods of performing live migration of virtual machines between hosts generally include a pre-copy memory migration stage having a warm-up phase and a stop-and-copy-phase followed by a post-copy memory migration stage. In the pre-copy warm-up phase, a hypervisor copies all of the memory pages associated with the source virtual machine on the source host to the destination host while the source virtual machine is still running on the source host. If some memory pages change during the memory copy process, known as dirty pages, the dirty pages may be re-copied until the rate of re-copied pages is more than or equal to the page dirtying rate.

During the stop-and-copy phase, the source virtual machine is stopped, the remaining dirty pages are copied to the destination host, and the virtual machine is resumed on the destination host. The time between stopping the virtual machine on the source host and resuming the virtual machine on the destination host is known as "down-time". Unfortunately, a down-time of a live migration employing conventional techniques may be as long as seconds and is approximately proportional to the size of memory and applications running on the source virtual machine.

In the post-copy memory migration stage, the source virtual machine is suspended at the source host. When the source virtual machine is suspended, a minimal execution state of the source virtual machine (CPU, registers, and non-pageable memory) is transferred to the destination host. The destination virtual machine is then resumed at the destination host, even though the entire memory state of the source virtual machine has not yet been transferred, and still resides at the source host. At the destination host, when the destination virtual machine tries to access pages that have not yet been transferred, it generates page-faults, which are trapped at the destination host and redirected towards the source host over the network. Such faults are referred to as network faults. The source host responds to the network-fault by sending the faulted page. Since each page fault of the running destination virtual machine is redirected towards the source host, it can degrade the applications running inside the destination virtual machine.

Copying pages over a network is inherently unreliable. If a destination host or the network between the source host and the destination host encounters a problem, migration may fail. In such circumstances, it may be necessary to remove the portion of the virtual machine at the destination host and start again with a new destination host.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
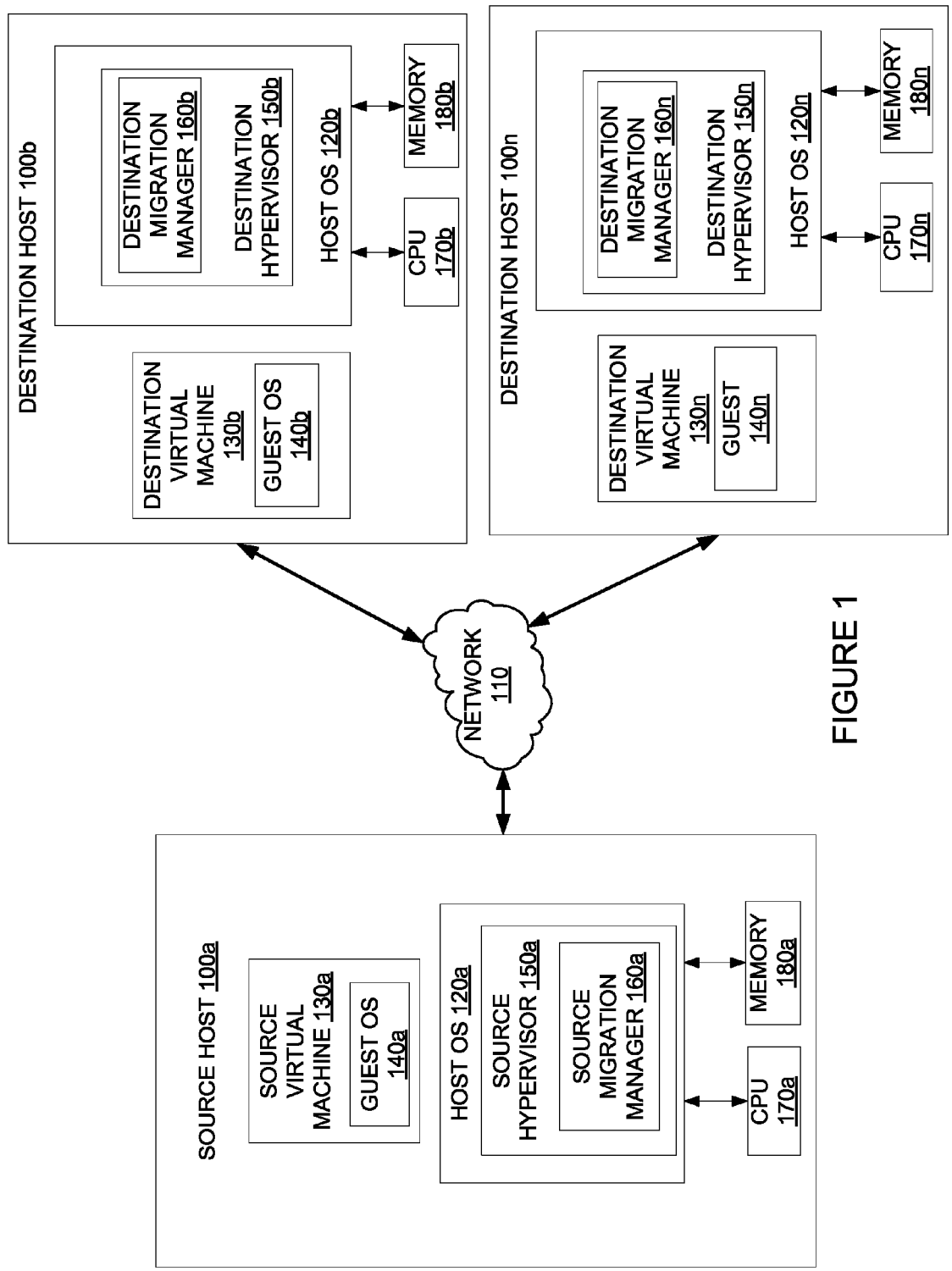
FIG. 1 is a block diagram that illustrates an embodiment of a source host computer system and one or more destination host computer systems in which embodiments of the present invention may be implemented.

Methods and systems for fast migrating of a source virtual machine located on a source host to one or more destination hosts are described herein. In one embodiment, a source migration manager of a hypervisor is configured to perform a live-migration of a virtual machine from a source host to a destination host using a pre-warm-up migration phase. The source migration manager identifies a destination host. The source migration manager copies at least one data segment corresponding to a portion of a state of a source virtual machine to the destination host. As used herein, a data segment may refer to any size portion of memory, including, but not limited to, a bit, a byte, a word, a page of memory, etc. The source migration manager receives an indication that a warm-up exit condition has been attained. The source migration manager remains in a warm-up phase an continues copying data segments corresponding to the state of the source virtual machine to the destination host, even if the entire state of the source virtual machine has been copied to the destination host. The source migration manager receives a command to migrate the source virtual machine to the destination host after copying the at least one data segment to the destination host. Since a warm-up exit condition has been attained, the source migration manager exits the warm-up migration phase.

In another embodiment of a method for live-migration of a virtual machine from a source host to a destination host using a pre-warm-up migration phase, the source migration manager identifies destination host. The source migration manager copies at least one data segment corresponding to a portion of a state of the source virtual machine to the destination host. The source migration manager receives a command to migrate the source virtual machine to the destination host after copying the at least one data segment to the destination host. Since a warm-up exit condition has not been attained, the source migration manager remains in a warm-up phase and continues copying data segments corresponding to the state of the source virtual machine to the destination host. The source migration manager receives an indication that a warm-up exit has been attained. Since a warm-up exit condition has been attained, the source migration manager exits the warm-up migration phase.

In another embodiment, a source migration manager of a hypervisor is configured to perform a live-migration of a virtual machine from a source host to a plurality of destination hosts concurrently. The source migration manager receives a command to migrate a source virtual machine to a plurality of destination hosts. The source migration manager copies a state of the source virtual machine to the plurality of destination hosts. When the source migration manager receives an indication of successful booting of a destination virtual machine, the source migration manager terminates transmission of the state of the source virtual machine to the remaining plurality of destination hosts.

In yet another embodiment, a source migration manager of a hypervisor is configured to perform a live-migration of a virtual machine from a source host to a plurality of destination hosts concurrently and employ a pre-warm-up phase. The source migration manager identifies a plurality of destination hosts. The source migration manager copies at least one data segment corresponding to a portion of a state of a source virtual machine to the plurality of destination hosts. The source migration manager receives a command to migrate the source virtual machine to one or more selected destination hosts of the plurality of destination hosts after copying the at least one data segment to the destination hosts. As used herein, selected destination hosts refer to one or more destination hosts selected from the plurality of destination hosts by the source migration manager.

When the source migration manager receives an indication of successful booting of at least one destination virtual machine, the source migration manager terminates transmission of the state of the source virtual machine to the remaining plurality of destination hosts.

Embodiments of the present invention that employ a pre-warm-up phase may provide a high availability solution to live migration that is substantially faster than related art live migration methods. Embodiments of the present invention that employ live migration of a source virtual machine to a plurality of destination hosts may substantially reduce the likelihood of failure to transfer the source virtual machine. For example, if the chance of failure for migration to one destination host is 1%, with two destination hosts, the chance of failure may be as low as 0.01%.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an embodiment of a source host computer system 100a (the "source host 100") and one or more destination host computer systems 100b-100n (the "destination hosts 100b-100n") in which embodiments of the present invention may be implemented. A source virtual machine 130a runs a guest operating system 140a to manage its resources. In one embodiment, the source host 100a may access multiple remote systems (e.g., the destination hosts 110b-110n) over a network 110, which may be a private network (e.g., a local area network (LAN), a wide area network (WAN), intranet, etc.) or a public network (e.g., the Internet). The source virtual machine 130a may run the same or different guest operating system (e.g., guest OS 140a), such as Microsoft Windows®, Linux®, Solaris®, Mac® OS, etc. The source host 100a may be a server, a workstation, a personal computer (PC), a mobile phone, a palm-sized computing device, a personal digital assistant (PDA), etc.

In one embodiment, the source host 100a runs a source hypervisor 150a to virtualize access to the underlying source host hardware, making the use of the source virtual machine 130a transparent to the guest OS 140a and users (e.g., a system administrator) of the source host 100a. Initially, as shown in FIG. 1, the source virtual machine 130a running the guest OS 140a is managed by the source hypervisor 150a. In one embodiment, a process is provided wherein the source virtual machine 130a is migrated from the source hypervisor 150a residing on a first host operating system (OS) 120a to one or more destination virtual machines 130b-130n running corresponding guest OS 140b-140n under the control of corresponding one or more destination hypervisors 150b-150n. The destination virtual machines 130b-130n may run the same or different guest operating systems (e.g., guest OSs 140b-140n), such as Microsoft Windows®, Linux®, Solaris®, Mac® OS, etc. Each of the destination hosts 100b-100n may be a server, a workstation, a personal computer (PC), a mobile phone, a palm-sized computing device, a personal digital assistant (PDA), etc.

It is noted that, in an alternative embodiment, the source hypervisor 150a and/or the destination hypervisors 150b-150n and destination virtual machines 130b-130n may reside on the same host OS.

The source host 100a and the one or more destination hosts 100b-100n also include hardware components such as one or more physical central processing units (CPUs) 170a-170n, memory 180a-180n, and other hardware components. In one embodiment, the source hypervisor 150a may include a source migration manager 160a and the destination hypervisors 150b-150n may include corresponding destination migration managers 160b-160n. It should be noted that the "source" and "destination" designations for the hypervisors and migration managers are provided for reference purposes in illustrating an exemplary implementation of the migration process according to embodiments of the present invention. It will be further appreciated that depending on the particulars of a given migration event, a hypervisor may at one time serve as the source hypervisor, while at another time the hypervisor may serve as the destination hypervisor.

The migration managers 160a-160n are components (e.g., a set of instructions executable by a processing device of the source host 100a and the destination hosts 100b-100n, such as CPUs 170a-170n) configured to perform the actions described in detail below with regard to FIGS. 2-6. Although shown as discrete components of the hypervisors 150a-150n, the migration managers 160a-160b may be a separate component externally coupled to hypervisors 150a-150n.

Figure 2:
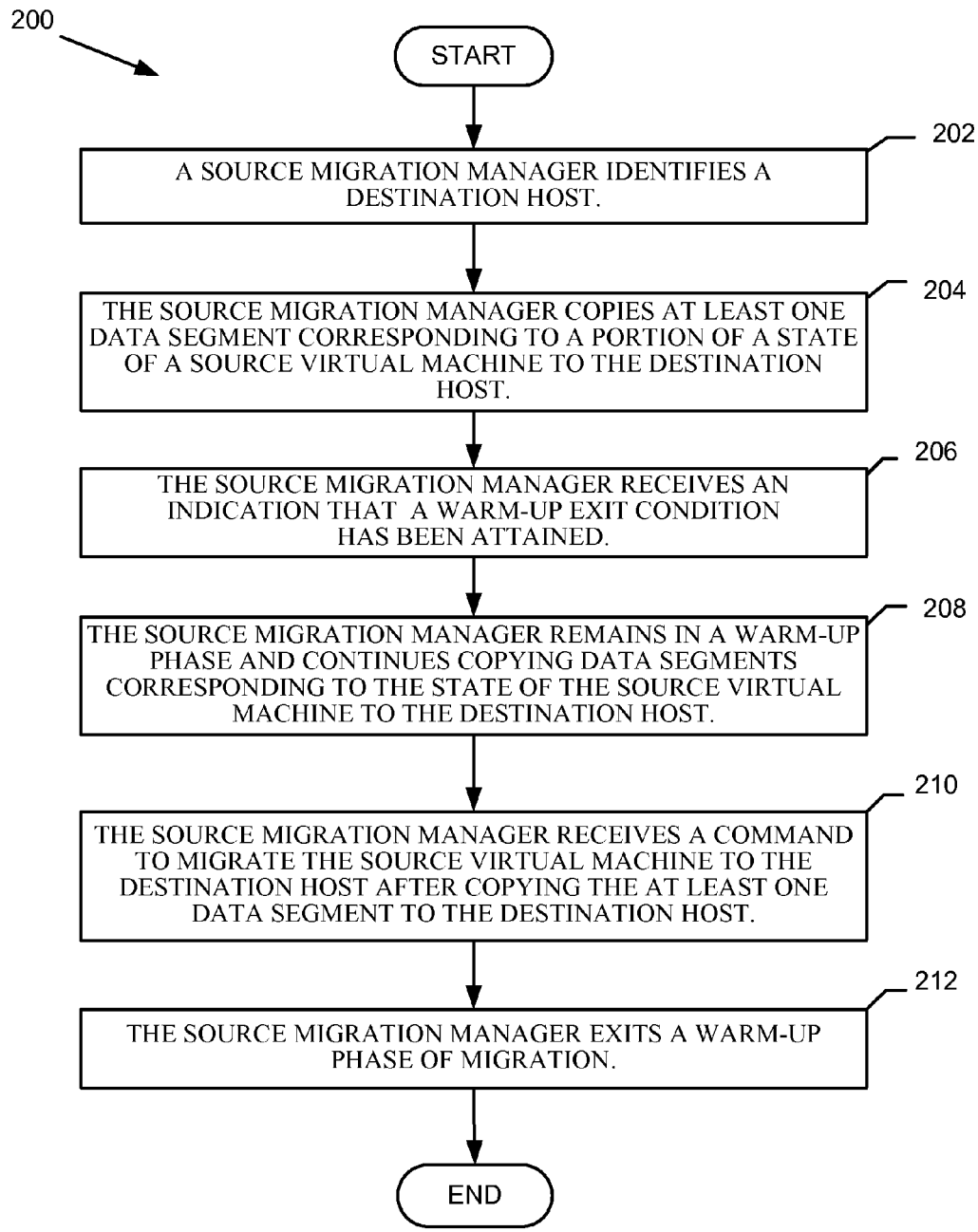
FIG. 2 is a flow diagram illustrating one embodiment of a method for live-migration of a virtual machine from a source host to a destination host using a pre-warm-up migration phase.
Figure 3:
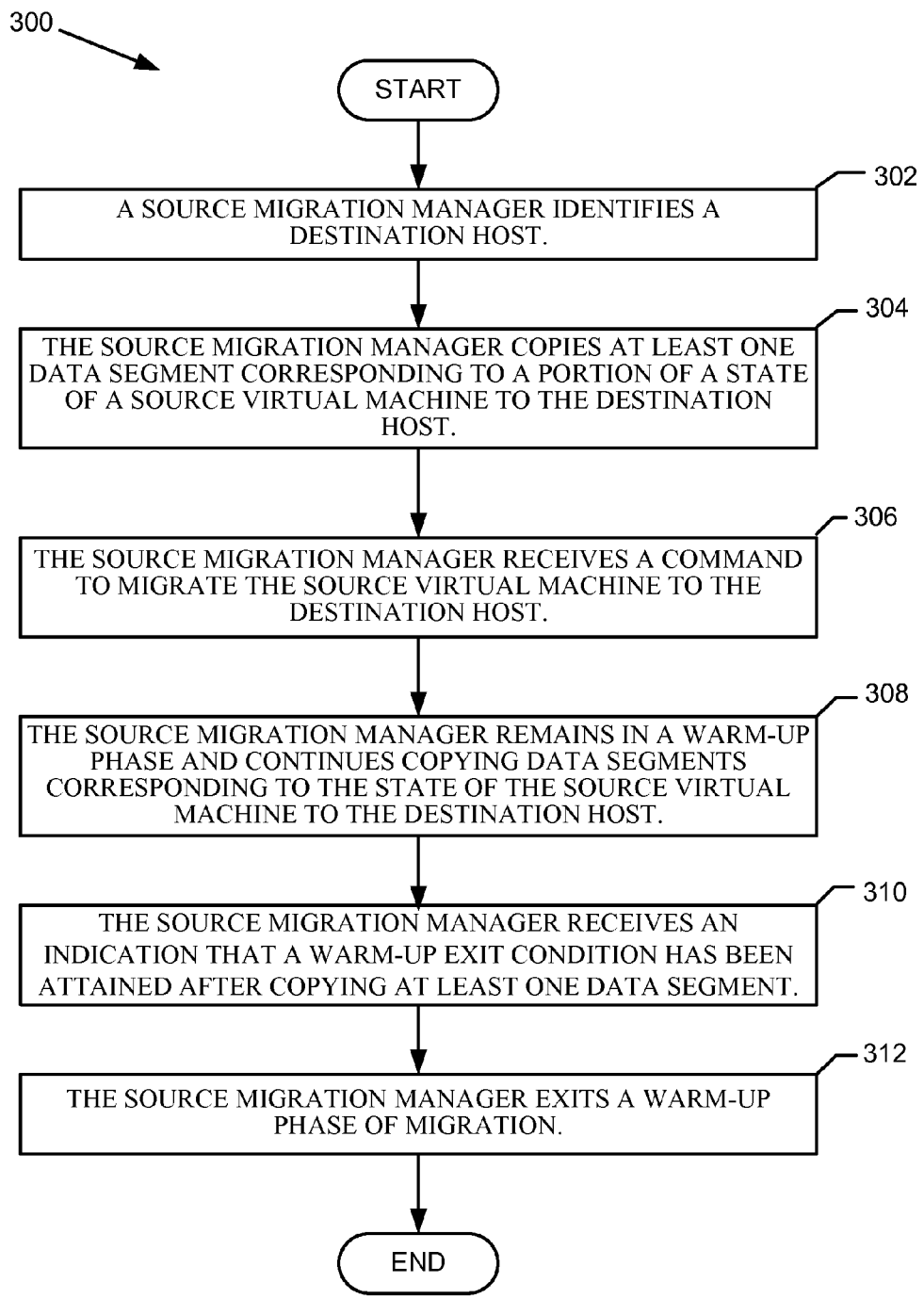
FIG. 3 is a flow diagram illustrating of another embodiment of a method for live-migration of a virtual machine from a source host to a destination host using a pre-warm-up migration phase.

In one embodiment, the source virtual machine 130a may be migrated to one destination host (e.g., 100b) employing a pre-warm-up phase of migration (e.g., see FIGS. 2 and 3). In another embodiment, the source virtual machine 130a may be migrated concurrently to a plurality of destination hosts 100b-100n without a pre-warm-up migration phase (e.g., see FIG. 5). In another embodiment, the source virtual machine 130a may be migrated concurrently to a plurality of destination hosts 100b-100n including a pre-warm-up migration phase (e.g., see FIG. 6).

FIG. 2 is a flow diagram illustrating of one embodiment of a method 200 for live-migration of a virtual machine from a source host to a destination host using a pre-warm-up migration phase. Although the method 200 is described in terms of live-migration of one source virtual machine (e.g., 130a) residing on the source host 100a to one destination host (e.g., 100b), the method 200 of FIG. 2 may be applied to migration of a virtual machine between any two hosts (100a-100n) over the network 110 or residing on the same host machine (e.g., source host 100a). Method 200 may be performed by processing logic (e.g., in computer system 700 of FIG. 7) that may comprise hardware (e.g., circuitry, dedicated logic, programmable logic, microcode, etc.), software (such as instructions run on a processing device), firmware, or a combination thereof. In one embodiment, method 200 is performed primarily by the source migration manager 160a residing within the source hypervisor 150a residing on the source host 100a of FIG. 1.

Referring to FIG. 2, in one embodiment, method 200 begins when, at block 202, the source migration manager 160a identifies destination host (e.g., destination host 100b). The identity of the destination host may be received from a system administrator (not shown) or a computer-generated process residing on the source host 100a or from a system migration manager (not shown) residing on a separate system server (not shown). For example, in one embodiment, the source host 100a and the destination host 100b may be two servers connected by the network 110, two virtual machines residing on the source host 100a, two nodes of the same or separate clouds, clusters, rings, etc. At block 204, the source migration manager 160a copies at least one data segment corresponding to a portion of a state of the source virtual machine 130a to the destination host 100b under the control of the destination migration manager 160b. At block 206, the source migration manager 160a receives an indication that a warm-up exit condition (described below) has been attained. At block 208, the source migration manager 160a remains in a warm-up phase and continues copying data segments corresponding to the state of the source virtual machine 130a to the destination host 100b. In one embodiment, the source migration manager 160a remains in a warm-up phase and continues copying data segments corresponding to the state of the source virtual machine 130a to the destination host 100b even when the complete state of the source virtual machine 130a has been copied to the destination host 100b.

At block 210, the source migration manager 160a receives a command (e.g., from a system administrator) to migrate the source virtual machine 130a to the destination host 100b after copying the at least one data segment to the destination host 100b. Since a warm-up exit condition has been attained, at block 212, the source migration manager 160a exits a pre-warm-up migration phase. In one embodiment, the source migration manager 160a exits a warm-up phase of migration and may enter a stop-and-copy phase (described below).

FIG. 3 is a flow diagram illustrating of another embodiment of a method 300 for live-migration of a virtual machine from a source host to a destination host using a pre-warm-up migration phase. Although the method 300 is described in terms of live-migration of one source virtual machine (e.g., 130a) residing on the source host 100a to one destination host (e.g., 100b), the method 300 of FIG. 3 may be applied to migration of a virtual machine between any two hosts (100a-100n) over the network 110 or residing on the same host machine (e.g., source host 100a). Method 300 may be performed by processing logic (e.g., in computer system 700 of FIG. 7) that may comprise hardware (e.g., circuitry, dedicated logic, programmable logic, microcode, etc.), software (such as instructions run on a processing device), firmware, or a combination thereof. In one embodiment, method 300 is performed primarily by the source migration manager 160a residing within the source hypervisor 150a residing on the source host 100a of FIG. 1.

Referring to FIG. 3, in one embodiment, method 300 begins when, at block 302, the source migration manager 160a identifies destination host (e.g., destination host 100b). The identity of the destination host may be received from a system administrator (not shown) or a computer-generated process residing on the source host 100a or from a system migration manager (not shown) residing on a separate system server (not shown). For example, in one embodiment, the source host 100a and the destination host 100b may be two servers connected by the network 110, two virtual machines residing on the source host 100a, two nodes of the same or separate clouds, clusters, rings, etc. At block 304, the source migration manager 160a copies at least one data segment corresponding to a portion of a state of the source virtual machine 130a to the destination host 100b under the control of the destination migration manager 160b. At block 306, the source migration manager 160a receives a command (e.g., from a system administrator) to migrate the source virtual machine 130a to the destination host 100b after copying the at least one data segment to the destination host 100b. At block 308, since a warm-up exit condition has not been attained, the source migration manager 160a remains in a warm-up phase and continues copying data segments corresponding to the state of the source virtual machine 130a to the destination host 100b. In one embodiment, the source migration manager 160a remains in a warm-up phase and continues copying data segments corresponding to the state of the source virtual machine 130a to the destination host 100b even when the complete state of the source virtual machine 130a has been copied to the destination host 100b.

At block 310, the source migration manager 160a receives an indication that a warm-up exit condition (described below) has been attained after copying at least one data segment. Since a warm-up exit condition has been attained, at block 312, the source migration manager 160a exits a pre-migration phase. In one embodiment, the source migration manager 160a exits a warm-up phase of migration and may enter a stop-and-copy phase (described below).

More particularly, between the time of receiving the identity of the destination host 100b and receiving the explicit command to migrate the source virtual machine 130a to create a destination virtual machine 130b under the control of the destination hypervisor 150b, the source migration manager 160a executes a pre-copy of data segments (e.g., a pre-warm-up phase of live migration) during a live-migration warm-up phase in order to shorten a length of time of the stop-and-copy phase of migration. The stop-and-copy phase may be significantly reduced (down to milliseconds). This live migration pre-warm-up phase continues indefinitely until at least the source migration manager 160a receives the explicit command (e.g., from a system administrator) to migrate, even if certain data segments are "dirtied" during the transfer, and even if the entire state of the source virtual machine 130a has been copied to the destination host 100b.

A warm-up exit condition may take many forms. In one embodiment, a warm-up exit condition may be attained when all of the state of the source virtual machine 130a has been transferred to the destination host 100b or when all of state related to memory has been transferred. In another embodiment, a system administrator may specify a predetermined downtime as a warm-up exit condition such that (the size of the state to be copied)/(rate of copying data segments)<downtime. In still another embodiment, the rate of changing data segments may be used to determine the warm-up exit condition such that (the size of the state to be copied)/(rate of copying data segments)–(rate of change of data segments))<downtime.

Figure 4:
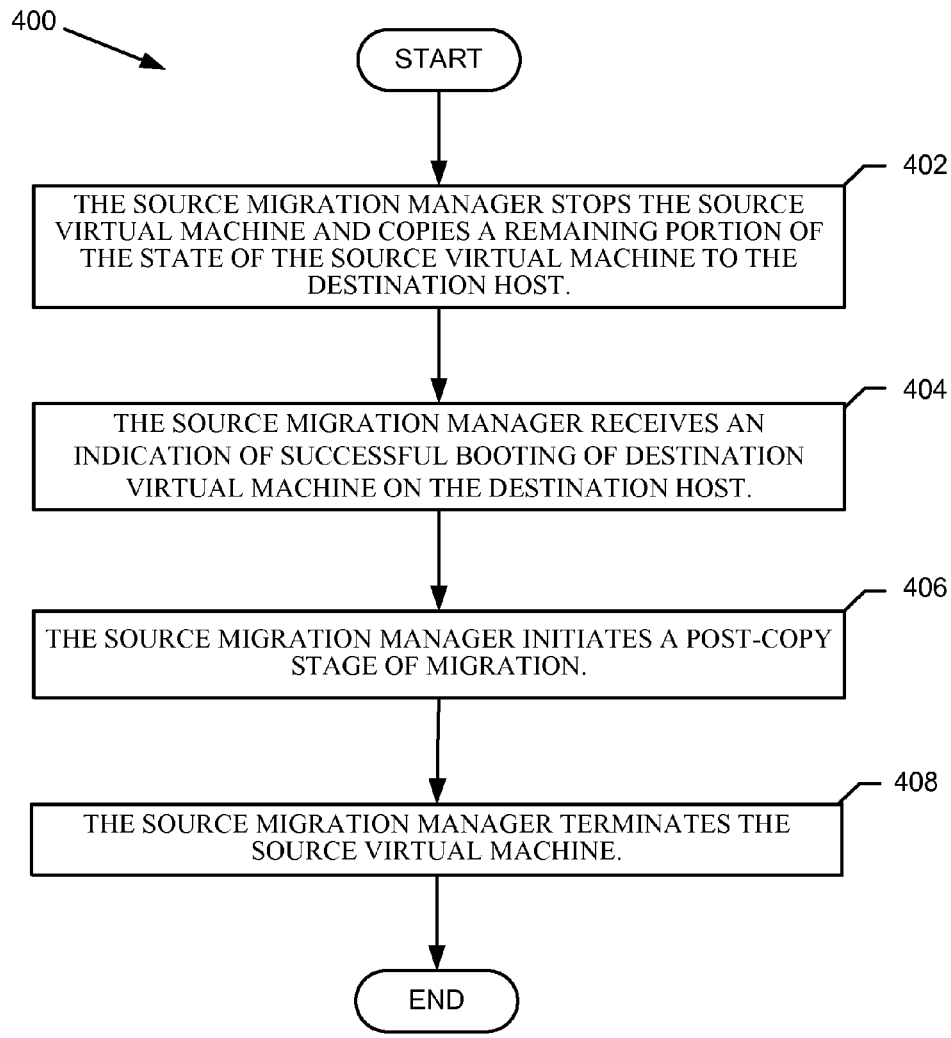
FIG. 4 is a flow diagram illustrating one embodiment of a post warm-up stage of live-migration of a virtual machine from a source host to a destination host.

FIG. 4 is a flow diagram illustrating one embodiment of a post warm-up stage 400 of live-migration of a virtual machine from a source host to a destination host. At block 402, the source migration manager 160a stops the source virtual machine 130a and copies a remaining portion of the state of the source virtual machine 130a to the destination host 100b. Once the full state of the source virtual machine 130a has been transferred to the destination host 100b under the control of the destination migration manager 160b of the destination hypervisor 150b, the destination migration manager 160b attempts to start the destination virtual machine 130b corresponding to the state of the source virtual machine 130a on the destination host 100b. If the destination virtual machine 130b successfully boots, the destination migration manager 160b transmits an indication to the source migration manager 160a over the network 110 of successfully starting the destination virtual machine 130b. At block 404, the source migration manager 160a receives an indication that the destination virtual machine 130b was successfully started on the destination host 100b. In one embodiment, at block 406, the steps of the post-copy memory migration stage described above may be carried out. At block 408, the source migration manager 160a may then terminate the source virtual machine 130a. In another embodiment, once the source migration manager 160a receives an indication that the destination virtual machine 130b was successfully started on the destination host machine 100b, then the source migration manager 160a may simply terminate the source virtual machine 130a.

If the destination virtual machine 130b does not successfully boot, the destination migration manager 160b may transmit an indication of failure over the network 110 to the source migration manager 160a to re-start the destination virtual machine 130b. More particularly, when the source migration manager 160a detects a failure in copying the state of the source virtual machine 130b to the destination host 110b and/or starting a destination virtual machine 130b corresponding to the copied state of the source virtual machine 130b on the destination host 110b, in one embodiment, the source migration manager 160a may restart the source virtual machine 130a and copy the state of the source virtual machine 130a to at least one other destination host (e.g., the destination host 100n) that is not the original destination host 100b.

In an embodiment, the state of the source virtual machine 130a located on a source host 100a may be copied to the destination host 100b from a proxy host (e.g., the destination host 110n) that is separate from a source host 100a.

Figure 5:
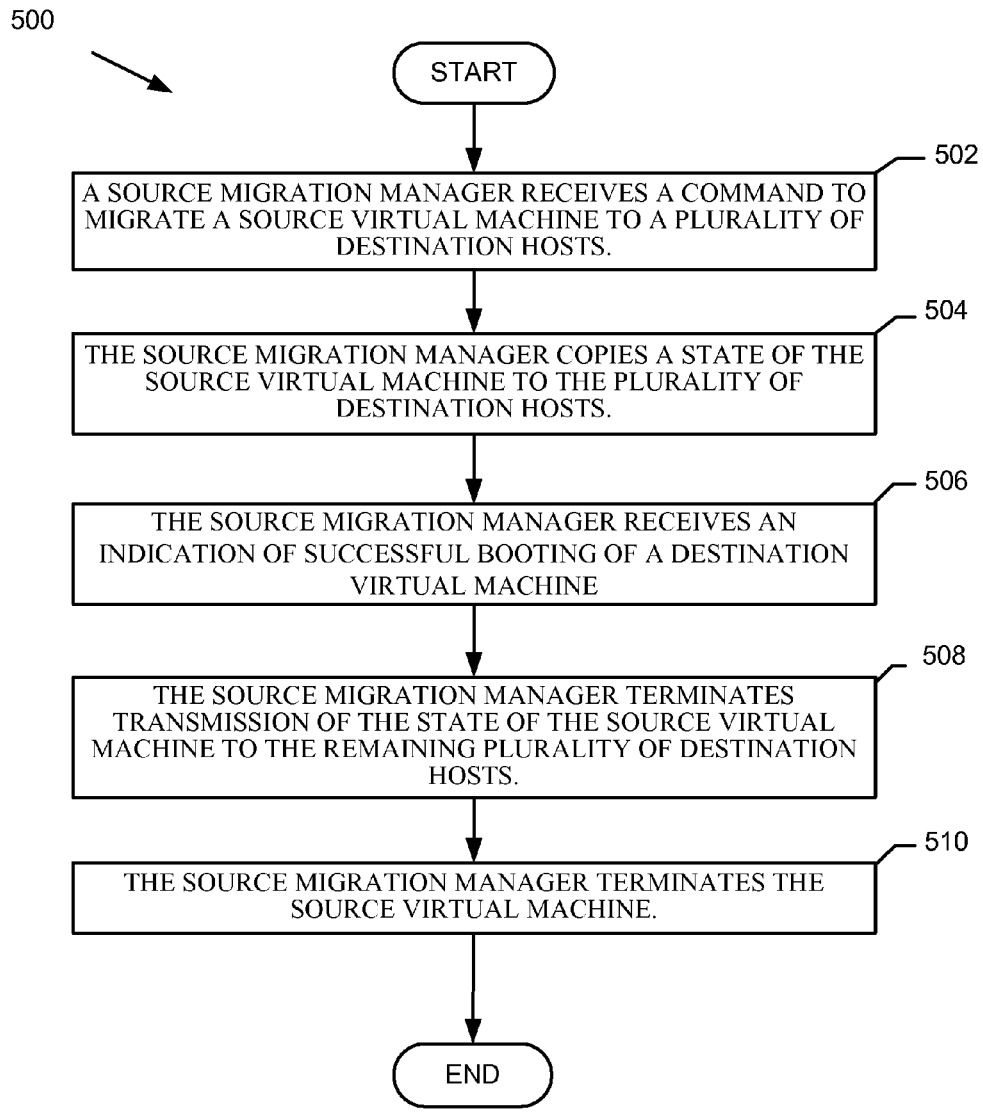
FIG. 5 is a flow diagram illustrating one embodiment of a method for live-migration of a virtual machine from a source host to a plurality of destination hosts concurrently.

FIG. 5 is a flow diagram illustrating one embodiment of a method 500 for live-migration of a virtual machine from a source host (e.g., 100a) to a plurality of destination hosts (e.g., 100b-100n) concurrently. The method 500 of FIG. 5 is applicable to the migration of a source virtual machine 130a from a source host 100a to a plurality of destination hosts 100b-100n over the network 110 or within the same host (e.g., source host 100a). Method 500 may be performed by processing logic (e.g., in computer system 700 of FIG. 7) that may comprise hardware (e.g., circuitry, dedicated logic, programmable logic, microcode, etc.), software (such as instructions run on a processing device), firmware, or a combination thereof. In one embodiment, method 500 is performed primarily by the source migration manager 160a residing within the source hypervisor 150a of the source host 100a of FIG. 1.

Referring to FIG. 5, in one embodiment, method 500 begins when, at block 502, the source migration manager 160a receives a command (e.g., from a system administrator) to migrate the source virtual machine 130a to a plurality of destination hosts (e.g., 100b-100n). The source host 100a and the destination hosts 100b-100n may be servers connected by the network 110, a plurality of virtual machines residing on the source host 100, a plurality of nodes of the same or separate clouds, clusters, rings, etc. The source migration manager 160a may identify destination hosts (e.g., 100b-100n) either prior to receiving the command to migrate the source virtual machine 130a, or identities of destination hosts may accompany data within the command to migrate. The identities of the destination hosts (e.g., 100b-100n) may be received from a system administrator (not shown) or a computer-generated process residing on the source host 100a or from a system migration manager module (not shown) under the control of a separate system server (not shown). In an embodiment, the plurality of destination hosts (e.g., 100b-100n) may be selectable such that no two destination hosts share a common intervening network node in a network path between the source host 100a and the plurality of destination hosts (e.g., 100b-100n. In one embodiment, the source migration manager 160a may pre-map nodes in the network 110 between the source host 100a and two or more of the destination hosts (e.g., 100b-100n) and identify common network nodes in respective paths. If a common network node is identified, another destination host may be selected or the path through the network 110 specified to avoid common intervening network nodes by means known in the art. At block 504, the source migration manager 130a copies a state of the source virtual machine 130a to the plurality of destination hosts 100b-100n. Migration to a plurality of destination hosts 100b-100n may be carried out concurrently.

Once the full state of the source virtual machine 130a has been transferred to at least one destination host (e.g., 100b) under the control of a destination migration manager (e.g. 160b) of a destination hypervisor (e.g., 150b), the destination migration manager 160b may attempt to start a destination virtual machine (e.g., 130b) corresponding to the state of the source virtual machine 130a on the destination host 100b. If the destination virtual machine 130b successfully boots, the destination migration manager 160b transmits over the network 110 to the source migration manager 160a an indication of successfully starting the destination virtual machine 130b.

At block 506, the source migration manager 160a receives an indication that the destination virtual machine 130b was successfully started on the destination host 100b. At block 508, in one embodiment, the source migration manager 160a explicitly terminates transmission of the state of the source virtual machine 130a to the remaining plurality of destination hosts 100c-100n after receiving a first indication of successfully starting the first destination virtual machine 130b. In another embodiment, the source migration manager 160a may implicitly terminate transmission of the state of the source virtual machine 130a to a remaining plurality of destination hosts by simply stopping or terminating the source virtual machine 130a. If an explicit termination command is given, then the termination command may include an indication that the remaining plurality of destination migration managers remove a portion of the state of the source virtual machine 130a copied to a destination host. In one embodiment, the source migration manager 160a may execute a post-copy memory migration stage (as described above). At block 510, the source migration manager 160a terminates the source virtual machine 130a.

In one embodiment, the source migration manager 160a may remain in a warm-up phase of migration corresponding to the source virtual machine 130a and continue copying data segments corresponding to the state of the source virtual machine 130a to the plurality of destination hosts 100b-100n when a warm-up exit condition has not been attained corresponding the source virtual machine 130a. In an embodiment, the source virtual machine 130a exits a warm-up phase of migration corresponding to the source virtual machine 130a after a warm-up exit condition has been attained corresponding to the source virtual machine 130a. In an embodiment, a warm-up exit condition corresponding to the source virtual machine 130a may be defined as a condition that a warm-up exit condition has been attained corresponding to a predetermined percentage of destination hosts.

If none of the destination virtual machine 130b-130n successfully boots, each of the destination migration managers 160b-160n may transmit over the network 110 to the source migration manager 160a an indication of failure to start their respective destination virtual machine 130b-130n. Once the source migration manager 160a receives an indication from each of the destination migration managers 160b-160n that their respective destination virtual machines 130b-130n were not successfully started on the destination hosts 100b-100n, in one embodiment, the source migration manager 160a may restart the source virtual machine 130a and copy the state of the source virtual machine 130a to at least one other host that is not one of the original plurality of destination hosts 100b-100n. In another embodiment, the source migration manager 160a may restart the source virtual machine 130a and attempt to re-copy the state of the source virtual machine 130a to the same plurality of destination hosts 100b-100n for a pre-determined number of times before giving up or until a predetermined timeout occurs.

In an embodiment, the state of the source virtual machine 130a located on a source host 100a may be copied to the plurality of destination hosts 100b-100n from a proxy host separate from the source host 100a. In one embodiment, once a destination virtual machine is successfully started, the corresponding destination migration manager may cascade migration of the source virtual machine 130a to a second plurality of destination hosts, etc.

Figure 6:
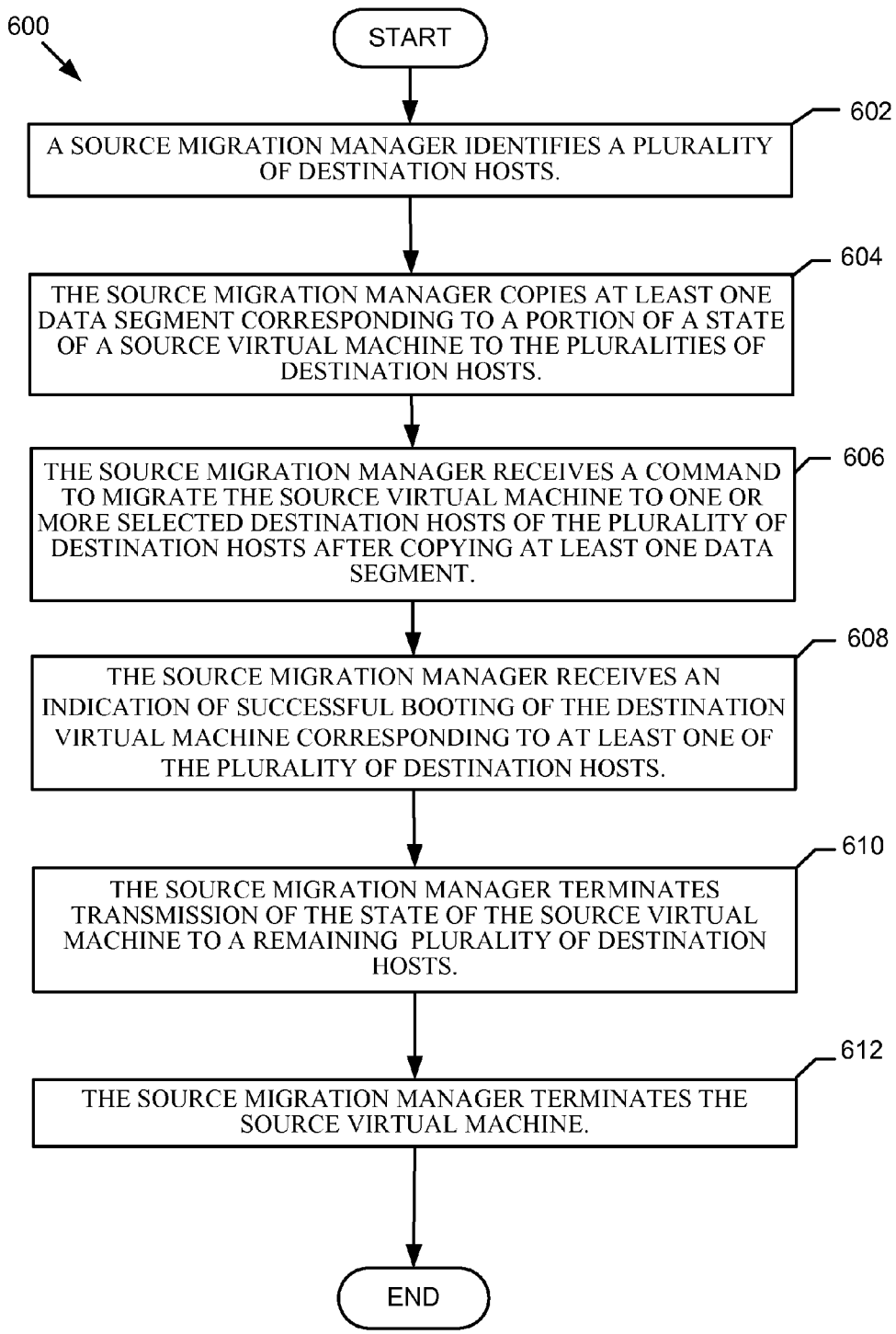
FIG. 6 is a flow diagram illustrating one embodiment of a method for live-migration of a source host to one or more destination hosts concurrently and employing a pre-warm-up migration phase.

FIG. 6 is a flow diagram illustrating one embodiment of a method 600 for live-migration of a source host (e.g., 100a) to one or more destination hosts (e.g., 100b-100n) concurrently and employing a pre-warm-up phase. The method 600 of FIG. 6 may be applied to migration of a source virtual machine 130a from a source host 100a to a plurality of destination hosts 100b-100n over a network 110 or residing on the same host (e.g., the source host 100a). Method 600 may be performed by processing logic (e.g., in computer system 700 of FIG. 7) that may comprise hardware (e.g., circuitry, dedicated logic, programmable logic, microcode, etc.), software (such as instructions run on a processing device), firmware, or a combination thereof. In one embodiment, method 600 is performed primarily by the source migration manager 160a residing within the source hypervisor 150a of the source host 100a of FIG. 1.

Referring to FIG. 6, in one embodiment, method 600 begins when, at block 602, the source migration manager 160a identifies a plurality of destination hosts (e.g., destination hosts 100b-100n). The source migration manager 160a may receive the identities of destination hosts (e.g., 100b-100n) prior to receiving a command to migrate the source virtual machine 130a. The identities of the destination hosts (e.g., 100b-100n) may be received from a system administrator (not shown) or a computer-generated process residing on the source host 100a or from a system migration manager module (not shown) under the control of a separate system server (not shown). In an embodiment, the plurality of destination hosts (e.g., 100b-100n) may be selectable such that no two destination hosts share a common intervening network node. In one embodiment, the source migration manager 160a may pre-map nodes in the network 110 between the source host 100a and two or more of the destination hosts (e.g., 100b-100n) and identify common nodes in respective paths. If a common node is identified, another destination host may be selected or the path through the network 110 specified to avoid common intervening nodes by means known in the art.

At block 604, the source migration manager 160a copies at least one data segment corresponding to a portion of a state of a source virtual machine (e.g., the source virtual machine 130a) to the plurality of destination hosts 100b-100n.

At block 606, the source migration manager 160a receives a command (e.g., from a system administrator) to migrate the source virtual machine 130a to one or more selected destination hosts of the plurality of destination hosts 100b-100n after copying the at least one data segment. Between the time of receiving the identities of the destination hosts 100b-100n and at least the time of receiving an explicit command to migrate the source virtual machine 130a to the destination hosts 100b-100n, the source migration manager 160a pre-copies data segments of the virtual machine 130a to each of the destination hosts 100b-100n in a live-migration pre-warm-up phase as described above with respect to FIGS. 2 and 3. This live migration pre-warm-up phase continues indefinitely until at least the explicit command to migrate is received, even if certain data segments are "dirtied" during the transfer process, and even if the entire state of the source virtual machine 130a has been copied to each of the destination hosts 100b-100n.

Thus, in one embodiment, before receiving a command to migrate the source virtual machine 130a, the source migration manager 160a may remain in a warm-up phase and continue copying data segments corresponding to the state of the source virtual machine 130a to the one or more selected destination hosts of the plurality of destination hosts 100b-100n when the complete state has been copied to at least one of the plurality of destination hosts 100b-100n. In another embodiment, the source migration manager 160a may remain in a warm-up phase and continue copying data segments corresponding to the state of the source virtual machine 130a to the one or more selected destination hosts of the plurality of destination hosts 100b-100n when a warm-up exit condition has not been attained corresponding the source virtual machine 130a. In an embodiment, the source migration manager 160a exits a warm-up phase of migration corresponding to the source virtual machine 130a after a warm-up exit condition has been attained corresponding to the source virtual machine 130a. In an embodiment, a warm-up exit condition corresponding to the source virtual machine 130a may be defined as a condition that a warm-up exit condition has been attained corresponding to a predetermined percentage of selected destination hosts 100b-100n.

At block 608, the source migration manager 160a receives an indication that a destination virtual machine (e.g., 130b) was successfully started on at least one of the plurality of destination hosts (e.g., 100b). At block 610, the source migration manager 160a terminates copying the state of the source virtual machine 130a to the remaining plurality of destination hosts (e.g., 130c-130n). At block 612, in one embodiment, the source migration manager 160a may terminate the source virtual machine 130a.

In one embodiment, if no virtual machine is successfully started on at least one of the plurality of destination hosts 100b-100n, the source migration manager 160a may copy the state of the source virtual machine 130a to at least one other machine that is not one of plurality of destination hosts 100b-100n.

More particularly, if the source migration manager 160a detects a failure in copying the state of the source virtual machine 130a to at least one of the plurality of destination hosts 100b-100n, or if the source migration manager 160a detects a failure in starting a virtual machine corresponding to the copied state of the source virtual machine 130a on at least one of the plurality of destination hosts 100b-100n, the source migration manager 160a may restart the source virtual machine 130a and copy the state of the source virtual machine 130a to at least one other machine that is not one of the original plurality of selected destination hosts 100b-100n.

In an embodiment, the state of the source virtual machine 130a located on the source host 100a may be copied to the plurality of destination host machines 100b-100n from a proxy host separate from the source host 100a (e.g., the destination host 100n).

In one embodiment, once a destination virtual machine is successfully started, the corresponding destination migration manager may cascade migration of the source virtual machine 130a to a second plurality of destination hosts, etc.

Figure 7:
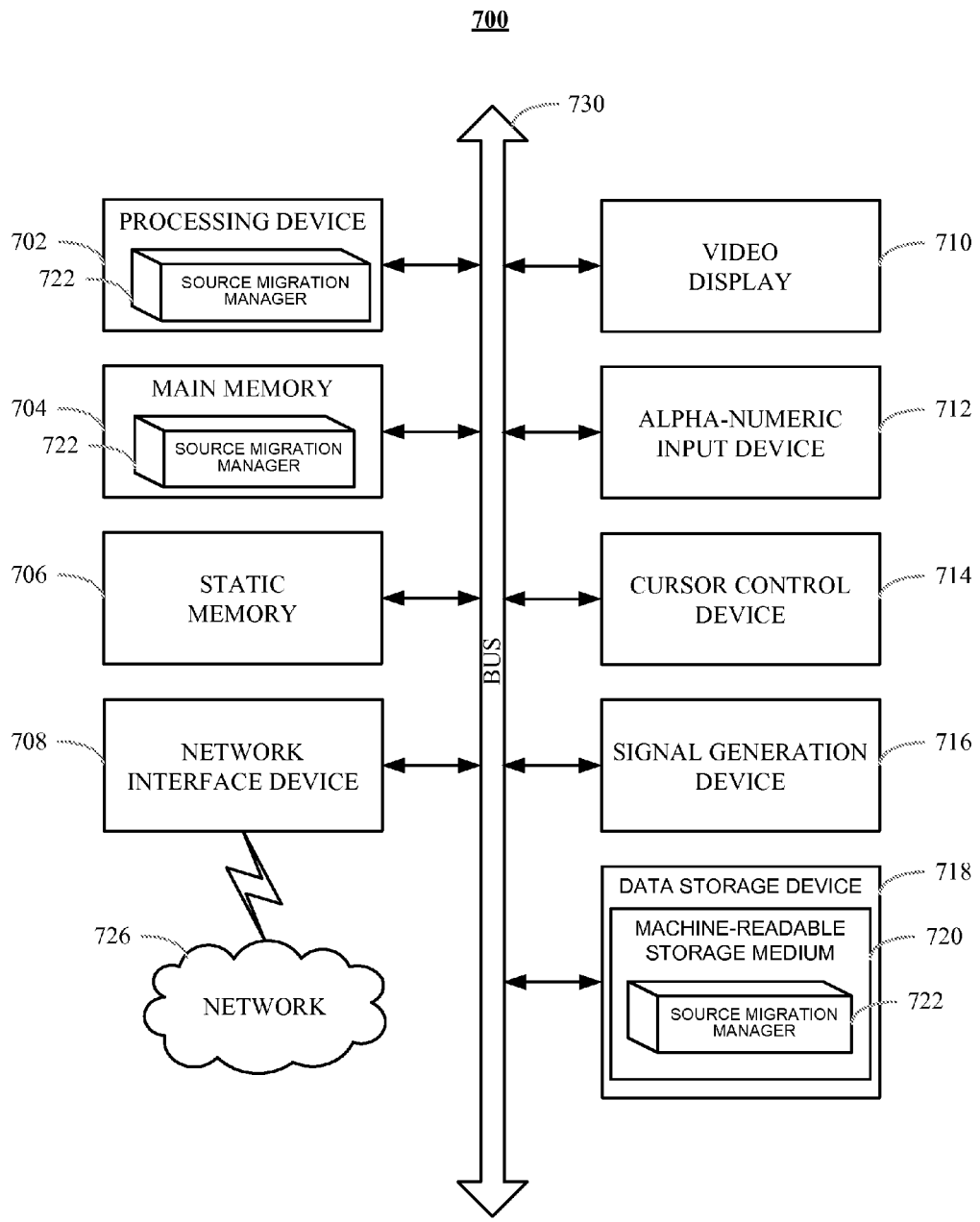
FIG. 7 illustrates a diagrammatic representation of a machine in the exemplary form of a computer system within which a set of instructions, for causing the machine to perform any one or more of the methodologies discussed herein, may be executed.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the source migration manager 160a for performing the operations and steps discussed herein.

Computer system 700 may further include a network interface device 708. Computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

Data storage device 718 may include a machine-readable storage medium (or more specifically a computer-readable storage medium) 720 having one or more sets of instructions (e.g., the source migration manager 160a) embodying any one or more of the methodologies of functions described herein. The source migration manager 160a may also reside, completely or at least partially, within main memory 704 and/or within processing device 702 during execution thereof by computer system 700; main memory 704 and processing device 702 also constituting machine-readable storage media. The source migration manager 160a may further be transmitted or received over a network 726 via network interface device 708.

Machine-readable storage medium 720 may also be used to store the device queue manager logic persistently. While machine-readable storage medium 720 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
identifying, by a source host processor, a plurality of destination hosts as an indication to the source host processor to enter a pre-warm-up phase for live migration of a source virtual machine residing on the source host processor to the plurality of destination hosts;
responsive to the source host processor entering the pre-warm-up phase, copying, by the source host processor, at least one data segment corresponding to a portion of a state of the source virtual machine to the plurality of destination hosts, the at least one data segment corresponding to a portion of memory employed by the source virtual machine; and
receiving a command to migrate the source virtual machine to one or more selected destination hosts of the plurality of destination hosts after copying the at least one data segment to the plurality of destination hosts.

2. The method of claim 1, further comprising, before receiving a command to migrate the source virtual machine, remaining in the pre-warm-up phase and continuing copying data segments corresponding to the state of the source virtual machine to the one or more selected destination hosts of the plurality of destination hosts when a complete state has been copied to at least one of the plurality of destination hosts.

3. The method of claim 1, further comprising remaining in the pre-warm-up phase of migration corresponding to the source virtual machine and continuing copying data segments corresponding to the state of the source virtual machine to the one or more selected destination hosts of the plurality of destination hosts when a warm-up exit condition has not been attained corresponding the source virtual machine.

4. The method of claim 3, wherein a warm-up exit condition corresponding to the source virtual machine is defined as a condition that a warm-up exit condition has been attained corresponding to a predetermined percentage of selected destination hosts.

5. The method of claim 1, further comprising exiting the pre-warm-up phase of migration corresponding to the source virtual machine after a warm-up exit condition has been attained corresponding to the source virtual machine.

6. The method of claim 1, further comprising:
receiving an indication that a virtual machine was successfully started on at least one of the plurality of destination hosts; and
terminating copying the state of the source virtual machine to the remaining plurality of destination hosts.

7. The method of claim 6, wherein terminating copying the state of the source virtual machine comprises transmitting a termination command to the remaining plurality of destination hosts.

8. The method of claim 7, wherein transmitting the termination command comprises transmitting an indication to remove a portion of the state of the source virtual machine copied to the respective one of the remaining plurality of destination hosts.

9. The method of claim 6, wherein terminating copying the state of the source virtual machine comprises stopping the source virtual machine.

10. The method of claim 6, further comprising terminating the source virtual machine.

11. The method of claim 1, wherein the state of the source virtual machine is copied to the plurality of destination hosts from a proxy host separate from the source host processor and the command to migrate the source virtual machine to the plurality of destination hosts is received from the source host processor.

12. The method of claim 1, wherein the state of the source virtual machine is transmitted to at least one of the plurality of destination hosts over a network.

13. The method of claim 1, wherein the source virtual machine and at least one of the plurality of destination hosts is located on the source host processor.

14. The method of claim 1, further comprising:
detecting a failure in copying the state of the source virtual machine to at least one of the plurality of destination hosts;
restarting the source virtual machine; and
copying the state of the source virtual machine to at least one other machine that is not one of the plurality of destination hosts.

15. The method of claim 1, further comprising:
detecting a failure in starting a virtual machine corresponding to the copied state of the source virtual machine on at least one of the plurality of destination hosts;
restarting the source virtual machine; and
copying the state of the source virtual machine to at least one other machine that is not one of the plurality of selected destination hosts.

16. The method of claim 1, wherein copying the state of the source virtual machine to the plurality of destination hosts is performed concurrently.

17. A system, comprising:
a memory;
a source host processor, operatively coupled to the memory, to:
identify a plurality of destination hosts as an indication to the source host processor to enter a pre-warm-up phase for live migration of a source virtual machine on the source host processor to the plurality of destination hosts;
responsive to the source host processor entering the pre-warm-up phase, copy at least one data segment corresponding to a portion of a state of the source virtual machine to the plurality of destination hosts, the at least one data segment corresponding to a portion of memory employed by the source virtual machine; and
receive a command to migrate the source virtual machine to the plurality of destination hosts after the at least one data segment is copied to the plurality of destination hosts.

18. The system of claim 17, wherein the source host processor is further to:
receive an indication that a virtual machine was successfully started on one of the plurality of destination hosts; and
terminate copying the state of the source virtual machine to the remaining plurality of destination hosts.

19. A non-transitory computer-readable storage medium comprising instructions that, when accessed by a source host processor, cause the source host processor to:
identify, by a source host processor, a plurality of destination hosts as an indication to the source host processor to enter a pre-warm-up phase for live migration of a source virtual machine residing on the source host processor to the plurality of destination hosts;
responsive to the source host processor entering the pre-warm-up phase, copy at least one data segment corresponding to a portion of a state of the source virtual machine to the plurality of destination hosts, the at least one data segment corresponding to a portion of memory employed by the source virtual machine; and
receive a command to migrate the source virtual machine to the plurality of destination hosts after the at least one data segment is copied to the plurality of destination hosts.

20. The non-transitory computer-readable storage medium of claim 19, wherein the source host processor further to:
receive an indication that a virtual machine was successfully started on one of the plurality of destination hosts and
terminate copying the state of the source virtual machine to the remaining plurality of destination hosts.

* * * * *